(12) United States Patent
Farnham et al.

(10) Patent No.: US 7,167,866 B2
(45) Date of Patent: Jan. 23, 2007

(54) SELECTIVE MULTI LEVEL EXPANSION OF DATA BASE VIA PIVOT POINT DATA

(75) Inventors: Shelly D. Farnham, Seattle, WA (US); Andrzej Turski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 484 days.

(21) Appl. No.: 10/764,176

(22) Filed: Jan. 23, 2004

(65) Prior Publication Data
US 2005/0165824 A1   Jul. 28, 2005

(51) Int. Cl.
*G06F 17/30* (2006.01)
(52) U.S. Cl. .................................... 707/100
(58) Field of Classification Search .............. 707/1, 707/2, 9, 10, 103 R, 100; 709/206; 715/853
See application file for complete search history.

(56) References Cited

U.S. PATENT DOCUMENTS

| | | |
|---|---|---|
| 5,867,157 A | 2/1999 | Goddard et al. |
| 5,982,367 A | 11/1999 | Alimpich et al. |
| 6,195,096 B1 | 2/2001 | Almpich et al. |
| 6,484,177 B1 | 11/2002 | Van Huben et al. |
| 6,583,797 B1 | 6/2003 | Roth |
| 2001/0015733 A1* | 8/2001 | Sklar ........................ 345/853 |
| 2002/0124133 A1* | 9/2002 | Duruoz ....................... 711/112 |
| 2002/0161779 A1* | 10/2002 | Brierley et al. .......... 707/103 R |
| 2002/0169840 A1* | 11/2002 | Sheldon et al. ............. 709/206 |
| 2002/0180803 A1* | 12/2002 | Kaplan et al. .............. 345/810 |
| 2003/0101086 A1 | 5/2003 | San Miguel |
| 2003/0202019 A1 | 10/2003 | Detweiler et al. |
| 2004/0169688 A1* | 9/2004 | Burdick et al. ............. 345/854 |
| 2005/0076312 A1* | 4/2005 | Gardner et al. ............. 715/853 |

OTHER PUBLICATIONS

L. Warry, European Search Report, Jun. 14, 2005, 2 pages, European Patent Office, the Hague, Netherlands.
G. Robertson, et al., Polyarchy Visualization: Visualizing Multiple Intersecting Hierarchies, CHI 2002 Conference Proceedings, Conference on Human Factors in Computing Systems, Minneapolis, MN, Apr. 20-25, 2002, CHI Conference Proceedings, Human Factors in Computing Systems, new York, NY, ACM, US, Apr. 20, 2002, V. 1, Issue 1, pp. 423-430.
K. Wittenburg, et al., Visual Focusing and Transition Techniques in a Treeviewer for Web Information Access, Visual Languages, 1997, Proceedings, 1997 IEEE Symposium on Isle of Capri, Italy, Sep. 23-26, 1997, Los Alamitos, CA, USA, IEEE Comput. Soc, US, Sep. 23, 1997, pp. 20-27.

(Continued)

*Primary Examiner*—Etienne P. LeRoux
(74) *Attorney, Agent, or Firm*—Amin, Turocy, & Calvin, LLP

(57) ABSTRACT

Systems and methodologies are provided for data visualization, retrieval and management of a logically ordered list by a selective multi level expansion of pivot point data. Such pivot points can represent hierarchy expansion designators to a subsequent level, which can include user created groups/clusters of data. The present invention facilitates data management by advantageously combining; the logical order of data with relevance criteria that can indicate importance of the data to a user. The logical order of the data can be a user friendly order that is easily recognizable and independent of the relevance criteria.

35 Claims, 9 Drawing Sheets

OTHER PUBLICATIONS

C. Kunz, et al., Contextualizating Search Results in Networked Directories, "http://www.hci.iao.fraunhofer.de", 2003, Crete, Greece, pp. 1-5.

C. Kunz, et al., Visual Representation and Contextualization of Search Results-List and Matrix Browser, "www.bnef.net", Oct. 13, 2002, Firenze, pp. 229-234.

M. Graham, et al., The Challenge of Visualizating Multiple Overlapping Classification Hierarchies, User Interfaces to Data Intensive Systems, 1999, Proceedings Los Alamitos, CA, USA, Sep. 5-6, 1999, Los Alamitos, CA, USA, IEEE Comput. Soc, US, Sep. 5, 1999, pp. 42-51.

R. Goldman and J. Widom. Summarizing and Searching Sequential Semistructured Sources. Technical Report, Mar. 2000. 8 pages.

J. Zobel, A. Moffat, and K. Ramamohanarao. Inverted Files versus Signature Files for Text Indexing. ACM Transactions on Database Systems, vol. 23 Issue 4, pp. 453-490, 1998.

* cited by examiner

SELECTIVE MULTI LEVEL EXPANSION OF DATA BASE VIA PIVOT POINT DATA

TECHNICAL FIELD

The present invention relates generally to data management, and more particularly to systems and methods of facilitating information search and retrieval within an ordered list by a selective multi level expansion of pivot point data.

BACKGROUND OF THE INVENTION

Increasing advances in computer technology (e.g., microprocessor speed, memory capacity, data transfer bandwidth, software functionality . . . ) have generally contributed to increased computer application in various industries. Today, computer users produce and manage large amounts of data or information, as compared to their respective work load in prior years. Generally, computer users now often multitask numerous items (e.g., documents, spreadsheets, statements, presentations, media . . . ) simultaneously and in conjunction with applications that facilitate management of these items.

Typically, a continuing problem in computer systems has been handling the growing amount of information or data available. The sheer amount of information being stored on disks or other media for databases in some form has been increasing dramatically. While files and disks were measured in thousands of bytes a few decades ago—at that time being millions of bytes (megabytes), followed by billions of bytes (gigabytes)—now databases of a million megabytes (terabytes) and even billions of megabytes are being created and employed in day-to-day activities.

As such, various software-based tools have been developed to aid user(s) with multi-tasking. One very powerful tool is a file data retrieval and organization system, which allows users to quickly view and access directories and their respective content. For example, a file management system can present directories and/or contents via a tree-based hierarchy (e.g., object hierarchy)—which can be a logical and user intuitive scheme for presentation of information associated with file management.

At the same time, in designing such tools a key idea of the database-based operating system should generally be an ability to find desired items quickly by executing a query that can involve a limited number of item properties. While such query approach can seem powerful, the success of the system generally depends on an ability to create a user interface that will make queries simple and intuitive for average users. For example, in its native form, database queries, (e.g. expressed in T-SQL language), can be difficult to handle even for professional programmers, much less the average end user. In addition, it is desirable for the query to speculate a relevance of a result for a given context.

At the same time, a typical rule of thumb based on the Pareto principle seems to apply to data base management, leading to much waste and inefficiency. Such rule of thumb, also referred to as the 80/20 rule, as applied to database list management seems to suggest that it is likely that only 20% of the data is accessed 80% of the time by a particular user. The remaining 80% of the data is accessed much less frequently, if at all. As the size of a database continues to grow, keeping the rarely accessed portion of the data base online in disk storage connected to a computer system can be an increasingly costly and wasteful strategy.

In general, many users employing a data base list such as a list of people now face a deluge of information from which to sort through and/or respond to (e.g. e-mails), such that the capability of being able to send, receive and process information through the data base list has almost become a hindrance to being productive. Accordingly, with such large numbers of people on a given list, it hence becomes difficult to manage information according to which person on the list is important, and who is not as important, without substantially expending valuable time for such determination. At the same time from a social standpoint, ordering a list of people, based merely on an importance criteria, can create negative connotations feelings of inferiority for the person who is categorized below others.

Therefore, there is a need to overcome the aforementioned deficiencies associated with conventional systems and methodologies related to data base lists.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the present invention. Rather, the sole purpose of this summary is to present some concepts of the invention in a simplified form as a prelude to the more detailed description that is presented hereinafter.

The present invention provides for systems and methods that facilitate information search and retrieval within an ordered list by a selective multi level expansion of pivot point data. Such an arrangement facilitates data management by concurrently combining: a logical order of data, with a relevance criteria that can indicate importance of the data to a user. The logical order of the data can be independent of the relevance criteria. Moreover, the present invention facilitates visual presentation of data to users of devices with limited displays, e.g. mobile electronic units such as PDAs, hand held appliances cellular phones, portable computers, programmable toys, watches, and the like.

According to one aspect of the present invention, a data list is initially arranged according to a logical order. Such logical order, for example, can be a user friendly order that is easily recognizable by a user; (e.g. simple and fixed in a user's mind; such as an alphabetical arrangement of names for data containing a list of people, or a sequential number order for data containing numbers, or important dates ordered chronologically.) A selective number of data can be designated as pivot points based on the relevance criteria, which can be based in part on the importance of the selected data to a user. When access to the data base is requested, such pivot points are initially presented to the user at a first level, and act as indices for the data list multi-level classification. The pivot points further represent hierarchy expansion designators to the second level, which can include user created groups/clusters of data.

Similarly, at a second level a selective number of data are designated as pivot points based on the relevance criteria, and can further selectively expand the list to a third level. Similar expansion can be repeated as the user continues to delve further into the base list and to up a level N, ("N" being an integer), wherein the various levels can display the data by different colors or shades thereof. Accordingly, at each expansion interval the user is presented with a limited number of data that are most relevant to the user, and managing/viewing of the data is thus facilitated.

In a related aspect of the present invention, the pivot points can be changed, and also updated dynamically, since the user's activities or state can affect the relevance criteria at any given time. The pivot points can be automatically updated via a priorities system, wherein the relevance criteria can be an importance, urgency, and/or any other suitable criteria as defined by a specific user. A value can be assigned to data, and the data with a value at a predetermined range selected as pivot points for each level. For example, when the data is a people list (e.g. people's names), the relevance criteria to user, for a particular person on the data base list, can be measured in terms of the number of e-mail messages sent from the user, (as opposed to being received by the user, which can additionally be employed as a secondary order, to that particular person. The relevance criteria can also consider the content of the messages and indicate a classification level (e.g., importance of the message). By automatically updating pivot points according to a determined classification such as importance, urgency, or criticality, much time is saved over conventional data base list management systems by mitigating the amount of time users sort and process through a plurality of data lists. In addition, for a people list data base, since the logical order can be alphabetical, the negative connotation associated with positioning people's name at the various levels can be minimized; e.g. any implication of inferiority for a data (person's name) can be justified because the logical list is arranged alphabetically. Moreover, if the relevance criteria are not fully accurate, the mistakes in arranging the data base can still be curable as the data base already employs a user intuitive logical order.

In accordance with one particular aspect of the present invention, relevance for a data can be generated based on a classifier, such as by determining the likelihood that the data is of high or some other priority to the user, (e.g. content based classification of emails sent by the user to recipients on the data list.) The classifier may be a Bayesian classifier, a support vector machine, and/or other type of classifier. The classifier can consider data features such as the structural relationship between the user and the data, as well as the time of events associated with the data. Other considerations such as an expected loss of non-designation of the data as a pivot point(s) can be determined in part based on the relevance criteria, as well as an expected cost of outputting the data as a pivot point at the current time. The user can also be alerted, for example, in response to determining that the expected loss for non-designation of a data as a pivot point is greater than the expected cost, in accordance with a profile (e.g., information store of user preferences). The relevance criteria in the context of a user's objective can also consider significance of other information, for example for e-mail communication purposes the relevance criteria can also consider organizational hierarchy of co-workers, closeness of family members and the like.

A current profile can be selected from a number of profiles, which can be editable by the user to reflect a different context (e.g., for a people list data base, the names associated with people at home, at work, leisure time, and the like.) The profiles are schedulable on a per-day and by-time basis, and can be locked to remain active unless subsequently unlocked. The profile can have a priority threshold settable by the user thus controlling the amount and/or types of data designated as pivot points for expansion to other levels.

In accordance with an aspect of the present invention, efficiency can be increased on the user interface side when frequently accessed information is readily displayed to the user, and not obscured by irrelevant entries. Moreover, access to low priority information is still possible, albeit by taking additional steps to delve into subsequent levels of the list hierarchy. Accordingly, low priority information is not completely removed from a user's access.

In addition, a query search performed on a data base list of the present invention is greatly facilitated as the query need not be calculated nor performed on all data. Put differently, a query search is initially performed on an initial level before progression to a subsequent level, and thus system resources can be preserved and properly allocated.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
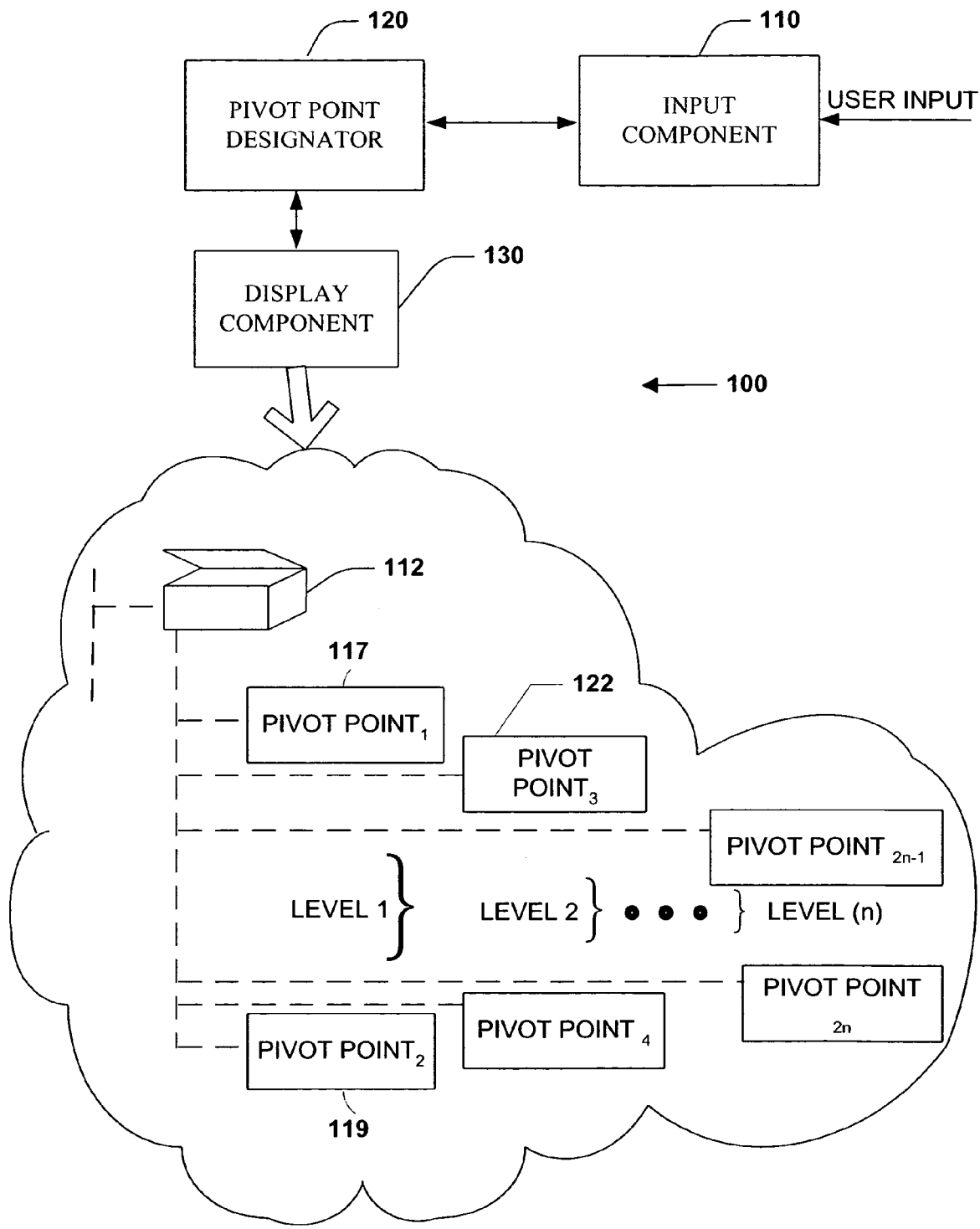
FIG. 1 is a block diagram of an object hierarchy structure system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

The present invention provides for systems and methods that facilitate information search and retrieval within an ordered list by advantageously combining benefits of ordering data via a simple logical order, and viewing or accessing selected data based on relevance criteria that indicates an importance of data to the user. Such simultaneous combination of the logical order for data lists and the relevance criteria facilitates the data base management and query. In addition, the relevance criteria allows for designation of data in the logical order of the list as pivot points, which can be subsequently employed for a selective multi level expansion of the data list. Accordingly, accuracy and speed can be improved over conventional data management, retrieval and visualization of large data lists.

FIG. 1 illustrates a system overview in connection with one particular data list display and management system. A data list hierarchy structure system 100 in accordance with an aspect of the present invention is illustrated. An input component 110 receives instructions from a user who is interacting with a data list 112, e.g. a people list. Such data list 112 can initially be arranged according to a logical order that is readily recognizable by a user and is simple or fixed in a user's mind; such as an alphabetical arrangement of names for a data base containing a list of people, or a sequential number order for a data base containing numbers. The input component 110 can include a computer keyboard, mouse, pointing device(s), voice activated computer component and the like. The input component 110 receives information from a user who intends to access the data base list, for example, for search and selection of a particular person's name in the people data list.

Based on a relevance criteria to the user, a selective number of data are designated as pivot points, via a pivot point designator 120 that can be part of the portable appliance employed by the user. Such pivot points are indices that are initially presented to the user at a first level, when access to the data base is requested. For example, as illustrated in FIG. 1, initially and at level 1, a user searching for specific data from the data list 112 is presented with a group of pivot data that are selected based on the relevance criteria to the user, and are arranged according to the logic order of the data list. Such pivot points are illustrated as objects 117 and 119, and are selected by the designator 120. Such designator 120 can for example be a classifier, which can also dynamically update and change the pivot points. The dynamic update can be in part based on the relevance criteria, which itself can be a function of; a user's state, e-mail management, e-mail content/context specific with respect to the data list and the user, as discussed in detail infra. The pivot points can be displayed concurrently with earlier designated pivot points, via a display component 130. It is to be appreciated that the generation of the pivot point 122 can be automatic, or require user action depending upon particular preferences. Moreover, it is to be appreciated that each level can include any number of pivot points depending upon the relevance criteria, the size of the data base and the like.

The pivot points represent hierarchy expansion designators to a second level, which can also include user created groups/clusters of data. In response to an instruction by a user to further expand the data list, by for example clicking a pointer in a vicinity of a pivot point, between pivot points, or other designated locations, the user obtains access to a second level that displays a predetermined number of the data list to the user, via the display component 130.

Similarly, at the second level a selective number of data (e.g. 122) are designated as pivot points based on the relevance criteria, and can further selectively expand the list to a third level. Similar expansion can be repeated as the user continues to delve into a level N (where N is a positive integer), with various levels displaying the data with different colors or shades thereof. Accordingly, at respective expansion intervals the user is presented with a limited number of data that are the most relevant to the user, and managing/viewing of the data is facilitated.

Figure 2:
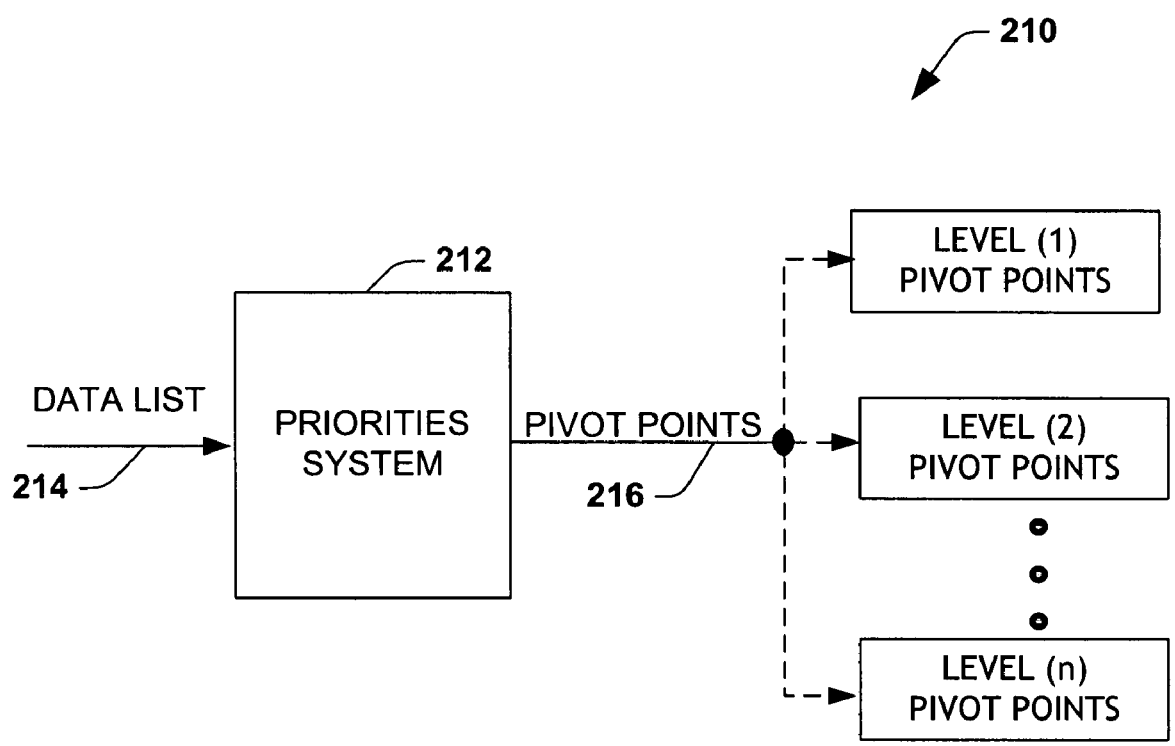
FIG. 2 is a schematic block diagram of a priorities system that designates pivot points for various hierarchy levels in accordance with an aspect of the present invention.

Referring now to FIG. 2 a system 210 illustrates a priorities system 212 that designates pivot points based at least in part upon the relevance criteria to a user, in accordance with an aspect of the present invention. The priorities system 212 operates on a data list 214, and generates a priority or measure of importance (e.g., probability value that the data is of a high or low importance) for a specific user, and provides one or more pivot points with an associated priority value at an output 216 for each level of the data list hierarchy. As will be described in more detail below, classifiers can be constructed and trained to automatically assign measures of priorities to the data list. For example, the output 216 can be formatted such that data are assigned a probability that the data or object belongs in a category of high, medium, low or other degree category of importance. When the data is a people list, the data can be automatically sorted in a recipient box of an e-mail program (not shown), for example, according to the determined category of importance for the various levels 1 to n (n being a positive integer). The sorting can also include directing files to system folders having defined labels of importance. This can include having folders labeled with the degree of importance such as low, medium and high, wherein data determined of a particular importance are sorted to the associated folder. Similarly, one or more audio sounds or visual displays (e.g., icon, symbol) can be adapted to alert the user that a pivot point having a desired priority has been set or located for a particular level.

According to another aspect of the present invention, a notification platform (not shown) can be employed in conjunction with the priorities system 212 to notify a user of changed pivot points based upon a user's specific state or acts at a particular time. For example, if the user sends three e-mails to a recipient who is on the user's list of people data base within a time span of thirty minutes, the notification platform can notify the user that the recipient has been assigned a pivot point at level one. The notification platform can also make decisions regarding when, where, and how to notify the user.

In the discussion infra, the generation of a pivot points for a data base of people's names (such as e-mail recipients) is described via an automatic classification system and process, wherein the importance and/or relevance of the recipient to the user is determined based on the content of the e-mail sent from the user to the recipient. Based on whether the e-mail sent to the recipient has a high importance, a decision is made whether the recipient is to be designated as a pivot point for a particular level.

Figure 3:
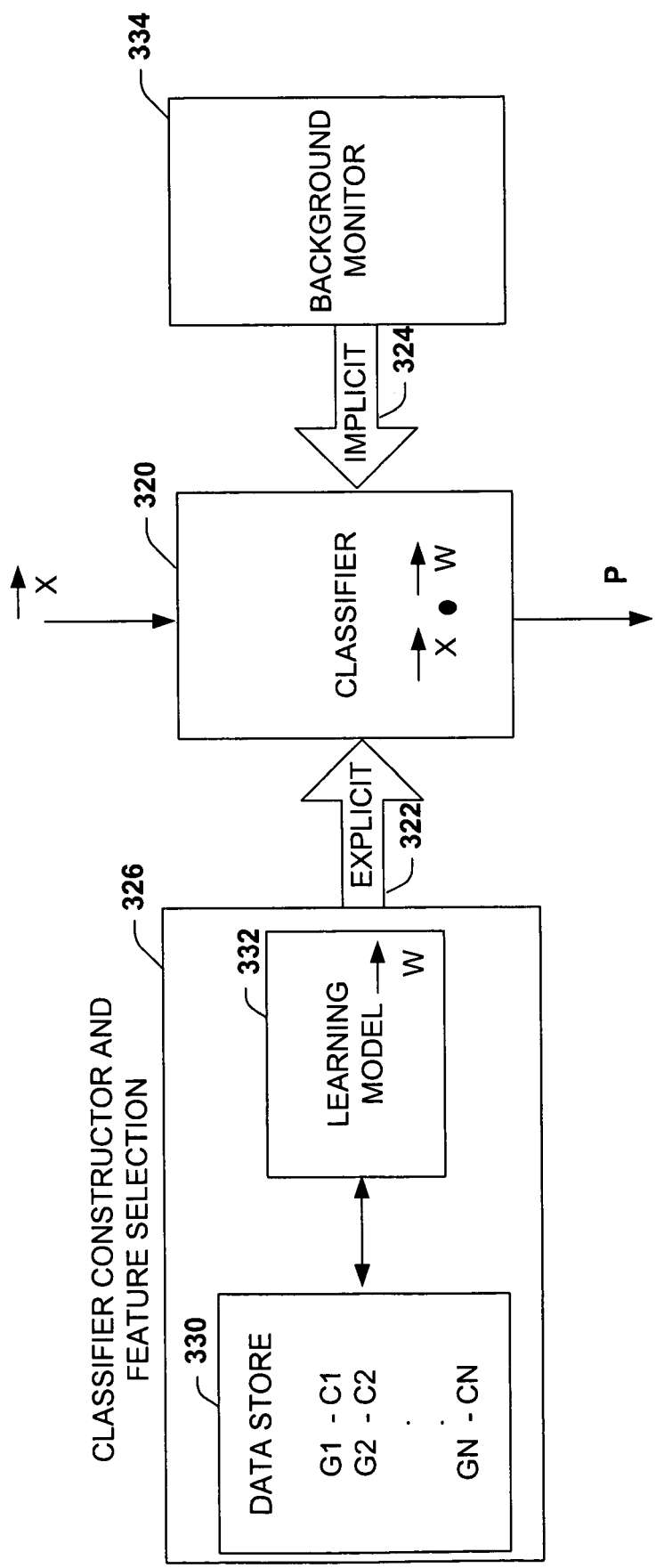
FIG. 3 is a block diagram illustrating a classifier in accordance with an aspect of the present invention.
Figure 4:
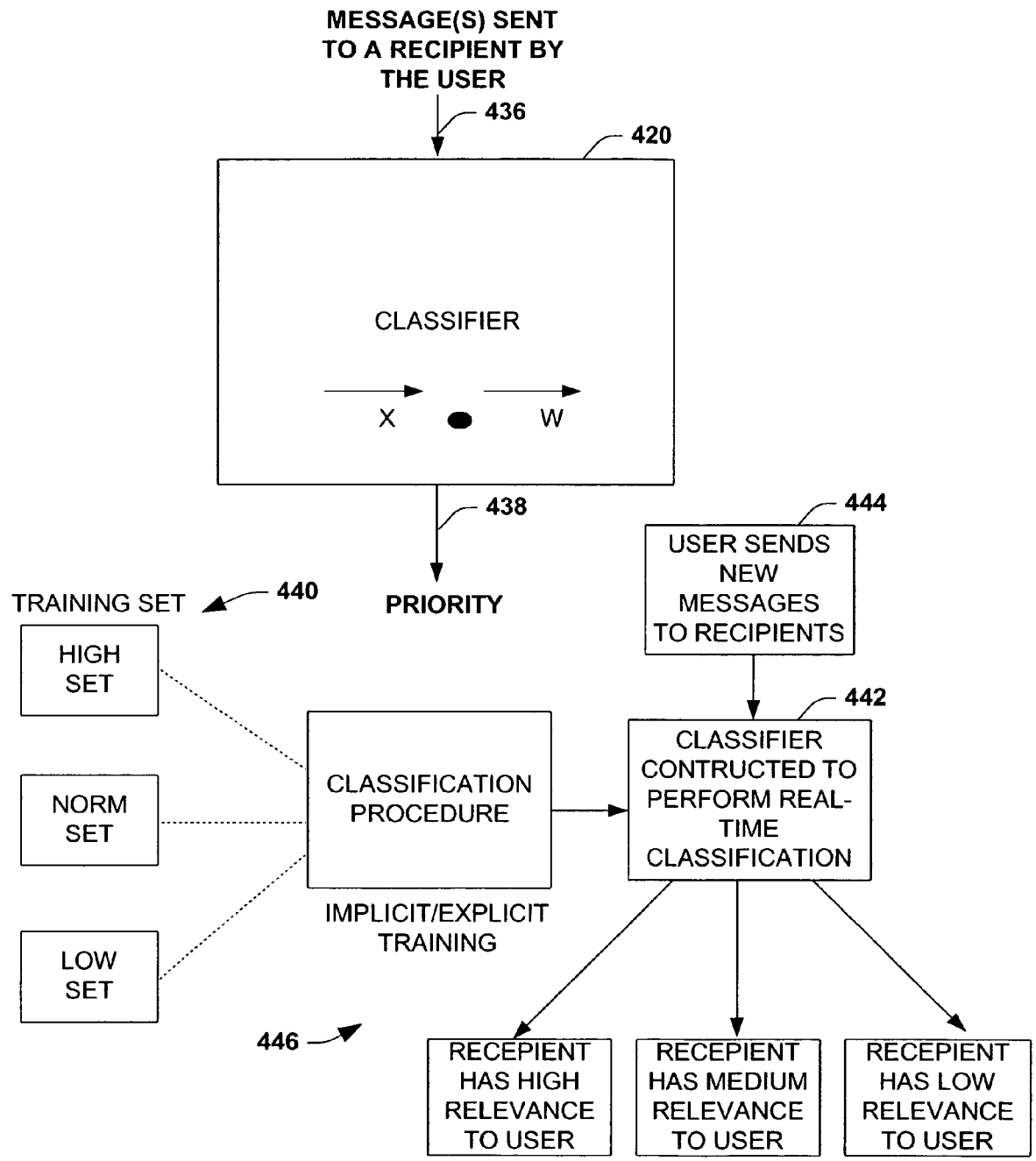
FIG. 4 is a schematic block diagram illustrating the relevance criteria for designating the pivot points and defined based on message content classification in accordance with an aspect of the present invention.

The description in this section is provided in conjunction with FIG. 3 and FIG. 4, the former which is a diagram illustrating explicit and implicit training of a text classifier, and the latter which is a diagram depicting how a priority for a text is generated by input to the text classifier. It is to be appreciated that the invention is not limited to defining the relevance criteria in terms of the content or context of e-mails sent by the user to recipients, and any other relevance criteria suitable for a user can be employed instead.

Referring now to FIG. 3, a text/data classifier 320 can be trained explicitly, as represented by the arrow 322, and implicitly, as represented by the arrow 324 to perform classification in terms of relevance to a user of the data base list. Explicit training represented by the arrow 322 is generally conducted at the initial phases of constructing the classifier 320, while the implicit training represented by the arrow 324 is typically conducted after the classifier 320 has been constructed—to fine tune the classifier 320, for example, via a background monitor 334. Specific description is made herein with reference to an SVM classifier, for exemplary purposes of illustrating a classification training and implementation approach. Other text classification approaches include Bayesian networks, decision trees, and probabilistic classification models providing different patterns of independence may be employed. Text classification as used herein also is inclusive of statistical regression that is utilized to develop models of priority.

According to one aspect of the invention Support Vector Machines (SVM) are employed as the classifier 320. It is to be appreciated that other classifier models may also be utilized such as Naive Bayes, Bayes Net, decision tree and other learning models. SVM's are configured via a learning or training phase within a classifier constructor and feature selection module 326. A classifier is a function that maps an input attribute vector, $x=(x1, x2, x3, x4, xn)$, to a confidence that the input belongs to a class—that is, $f(x)=$confidence (class). In the case of text classification, attributes are words or phrases or other domain-specific attributes derived from the words (e.g., parts of speech, presence of key terms), and the classes are categories or areas of interest (e.g., levels of priorities).

An aspect of SVMs and other inductive-learning approaches is to employ a training set of labeled instances to learn a classification function automatically. The training set is depicted within a data store 330 associated with the classifier constructor 326. As illustrated, the training set may include a subset of groupings G1 through GN that indicate potential and/or actual elements or element combinations (e.g., words or phrases) that are associated with a particular category or relevance criteria. The data store 330 also includes a plurality of categories 1 through M, wherein the groupings can be associated with one or more categories. During learning, a function that maps input features to a confidence of class is learned. Thus, after learning a model, categories are represented as a weighted vector of input features.

For category classification, binary feature values (e.g., a word occurs or does not occur in a category), or real-valued features (e.g., a word occurs in an e-mail sent to a recipient with an importance weight r) are often employed. Since category collections may contain a large number of unique terms, a feature selection is generally employed when applying machine-learning techniques to categorization. To reduce the number of features, features may be removed based on overall frequency counts, and then selected according to a smaller number of features based on a fit to the categories. The fit to the category may be determined via mutual information, information gain, chi-square and/or substantially any other statistical selection technique. These smaller descriptions then serve as an input to the SVM. It is noted that linear SVMs provide suitable generalization accuracy and provide suitably fast learning. Other classes of nonlinear SVMs include polynomial classifiers and radial basis functions and may also be utilized in accordance with the present invention.

The classifier constructor 326 employs a learning model 332 in order to analyze the groupings and associated categories in the data store 330 to "learn" a function mapping input vectors to confidence of class. For many learning models, including the SVM, the model for the categories can be represented as a vector of feature weights, w, wherein there can be a learned vector of weights for each category. When the weights w are learned, new texts are classified by computing the dot product of x and w, wherein w is the vector of learned weights, and x is the vector representing a new text. A sigmoid function may also be provided to transform the output of the SVM to probabilities P. Probabilities provide comparable scores across categories or classes from which priorities can be determined.

The SVM is a parameterized function whose functional form is defined before training. Training an SVM generally requires a labeled training set, since the SVM will fit the function from a set of examples. The training set can consist of a set of N examples. Each example consists of an input vector, $xi$, and a category label, $yj$, which describes whether the input vector is in a category. For each category there can be N free parameters in an SVM trained with N examples. To find these parameters, a quadratic programming (QP) problem is solved as is well understood. There is a plurality of well-known techniques for solving the QP problem. These techniques may include a Sequential Minimal Optimization technique as well as other techniques. As depicted in FIG. 4, a text input 436, e.g. an e-mail sent by a user of the data list to a recipient, has been transformed into an input vector x and applied to the classifier 420 for each category. The classifier 420 (or 320 of FIG. 3) utilizes the learned weight vectors w determined by classifier constructor 326 of FIG. 3 (e.g., one weight vector for each category) and forms a dot product to provide a priority output 438 of FIG. 4, wherein probabilities P may be assigned to the input text 336 indicating one or more associated priorities (e.g., high, medium, low).

Referring back to FIG. 3, training of the text classifier 320 as represented by the arrow 322 includes constructing the classifier in 326, including utilizing feature selection. In the explicit training phase, the classifier 320 can be presented with both time-critical and non-time-critical texts, so that the classifier may be able to discriminate between the two, for example. This training set may be provided by the user, or a standard or default training set may be utilized. Given a training corpus, the classifier 320 first applies feature-selection procedures that attempt to find the most discriminatory features. This process employs a mutual-information analysis. Feature selection can operate on one or more words or higher-level distinctions made available, such as phrases and parts of speech tagged with natural language processing. That is, the text classifier 320 can be seeded with specially tagged text to discriminate features of a text that are considered important when sent via an e-mail from the user to a recipient.

Feature selection for text classification typically performs a search over single words. Beyond the reliance on single words, domain-specific phrases and high-level patterns of features are also made available. Special tokens can also enhance classification. The quality of the learned classifiers for e-mail criticality, for example, can be enhanced by inputting to the feature selection procedures handcrafted features that are identified as being useful for distinguishing among e-mail of different time criticality. Thus, during feature selection, one or more words as well as phrases and symbols that are useful for discriminating among messages of different levels of time criticality are considered.

As the following examples illustrate, tokens and/or patterns of value in identifying the relevance of recipients names and their designation as pivot points, or to the criticality of messages sent by the user to people listed on the data base, include such distinctions as, and including Boolean combinations of the following:

Information in a Message Header

For Example:

To: Field (Recipient Information)
Addressed to how many recipients and organizational relation to user,
Addressed to a people designated as pivot points in prior classifications,
Cc:'d to a recipient already designated as a pivot point,
Bcc:'d to a recipient already designated as a pivot point.

From: Field (Sender Information)
Names on pre-determined list of important people, potentially segmented into a variety of classes of individuals, (e.g., Family members, Managers, Bosses, and the like)
Senders identified as internal to the user's company/organization,
Information about the structure of organizational relationships relative to the user drawn from an online organization chart such as:
  Managers user reports to,
  Managers of the managers of users,
  People who report to the user,
External business people.

Past Tense Information

These include descriptions about events that have already occurred such as:
We met,
meeting went,
happened,
got together,
took care of,
meeting yesterday.

Future Tense Information
Tomorrow,
This week,
Are you going to,
When can we,
Looking forward to,
Will this,
Will be.

Meeting and Coordination Information
Get together,
Can you meet,
Will get together,
Coordinate with,
Need to get together,
See you,
Arrange a meeting,
Like to invite,
Be around.

Resolved Dates

Future vs. past dates and times indicated from patterns of text to state dates and times explicitly or typical abbreviations such as:

On 5/2,
At 12:00.

Questions
Words, phrases adjacent to questions marks (?)

Indications of Personal Requests:
Can you,
Are you,
Will you,
you please,
Can you do,
Favor to ask,
From you.

Indications of need:
I need,
I'd like,
It would be great,
I want,
Please take care of.

Time Criticality
happening soon,
right away,
deadline will be,
deadline is,
as soon as possible,
needs this soon,
to be done soon,
done right away,
this soon,
by [date],
by [time].

Importance
is important,
is critical,
Word, phrase +!,
Explicit priority flag status (low, none, high).

Length and Volume of Message
Number of bytes in component of new message.

It is noted that the word or phrase groupings depicted above illustrate exemplary words, groupings, or phrases that may be utilized from which to conduct classifier training, and obtaining relevance for a particular recipient. It is to be appreciated that other similar words, groups, or phrases may be similarly employed and thus the present invention is not limited to the illustrated examples. Obviously, other relevance criteria besides the above described content-based analysis of e-mails, can be defined and employed in accordance with the present invention.

Furthermore, still referring to FIG. 3, implicit training of the classifier 320, as represented by the arrow 324, can be conducted by monitoring the user work or usage patterns via the background monitor 334 that can reside on the user's desktop or mobile computer, for example. For example, as users work, and lists of mails to be responded to are reviewed, it can be assumed that messages from relevant users are read and responded to first, and lower-priority messages are reviewed later, and/or deleted. That is, when presented with a new e-mail, the user is monitored to determine whether he or she immediately opens the e-mail, and in what order, deletes the email without opening, and/or replies to the e-mail relatively in a short amount of time. Thus, the classifier 320 is adapted such that a user is monitored while working or operating a system, the classifier is periodically refined by training in the background and updated for enhancing real-time decision-making. Background techniques for building classifiers can extend from those that update the classifier 320 with new training messages. In this example, based on the activity of the user of the people list in opening e-mails, a determination can be made of whether the name of people sending those e-mails can be assigned as pivot points. In addition, for each message sent to recipient and inputted into the classifier, for example, a new case for the classifier can be created. The cases can be stored as negative and positive examples of texts that are either high or low priority, for example. As an example, one or more low, medium, and high urgency classes can be recognized such that the probabilities of membership in each of these classes are utilized to build an expected criticality. Larger numbers of criticality classes can be utilized to seek higher resolution. For example, as illustrated in FIG. 4, a training set of messages 440 sent by the user to recipients (e.g., very high, high, medium, normal, low, very low, etc.) can be initially employed to train a classifier 442 to designate the recipient's name as a pivot point. Accordingly, real-time classification can be achieved, as indicated at 444, and new pivot points are classified according to the number of examples resolved by the training set 440. In FIG. 4, three such categories are illustrated for exemplary purposes, however, it is to be appreciated that a plurality of such categories may be trained according to varying degrees of desired importance for each hierarchy level. As illustrated, the newly sent messages 444 to recipients from the data list can be employed to labeled, tagged and/or sorted the recipient's name into one or more folders 446, for example, according to the priorities assigned by the classifier 442 to the recipients of the e-mails. Such assigned priorities and/or relevancies to the user can then be applied in designating the pivot points at each level.

Figure 5:
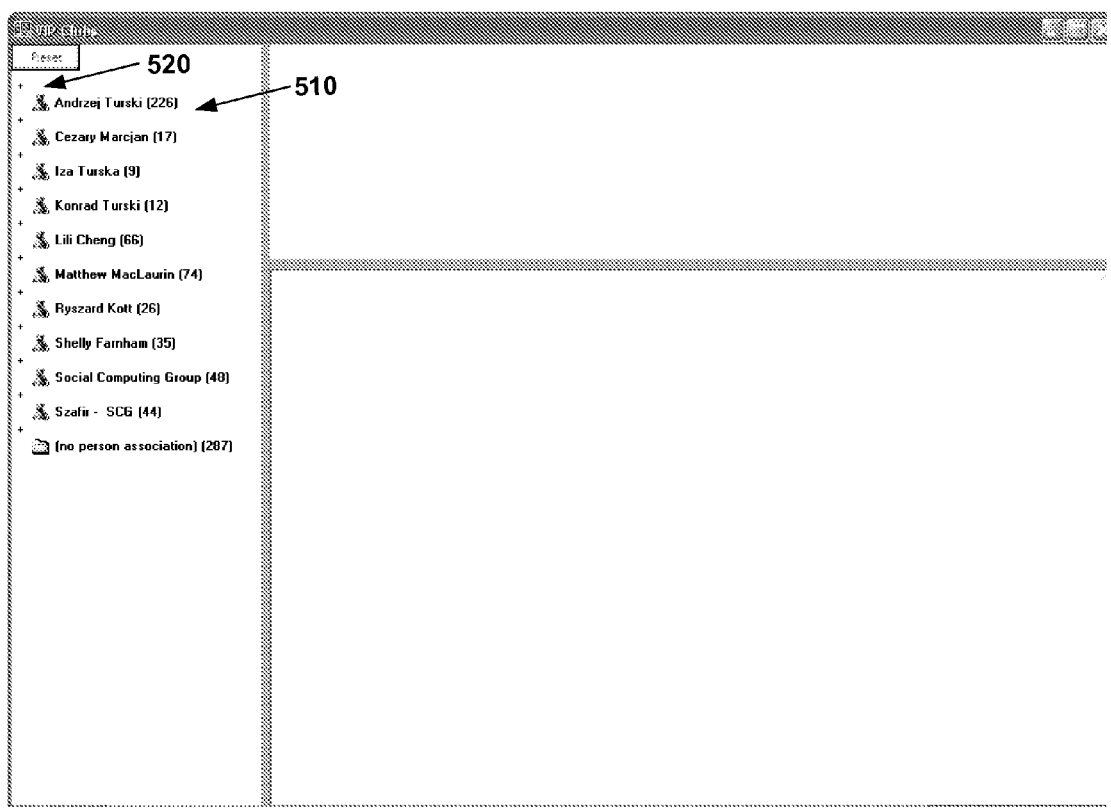
FIG. 5 is a diagram of an exemplary user interface and object hierarchy structure in accordance with an aspect of the present invention.
Figure 6:
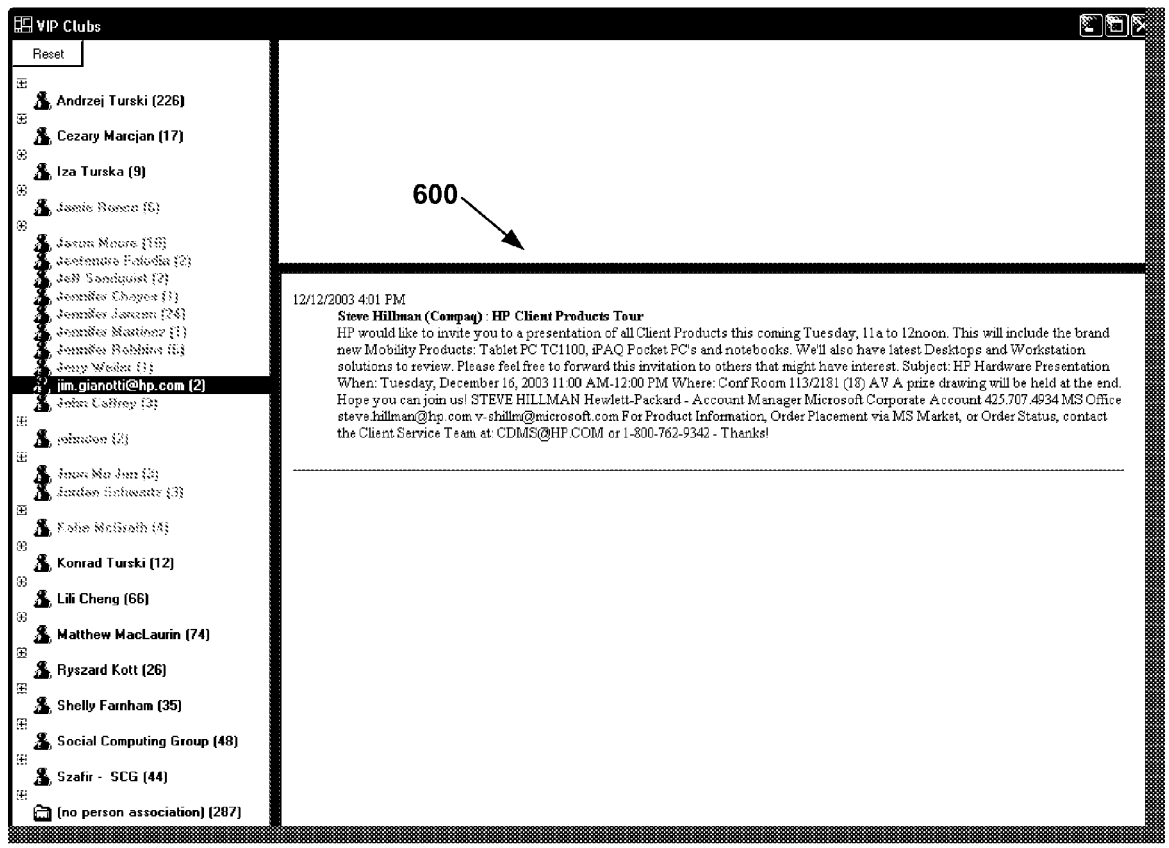
FIG. 6 is a diagram of a user interface of a people list in accordance with an aspect of the present invention.

Turning now to FIG. 5, an exemplary object hierarchy structure 500 in accordance with an aspect of the present invention is illustrated. The structure 500 depicts a plurality of pivot point data (e.g. 510) that are part of a people data base list in accordance with one aspect of the present invention. The exemplary illustrated logical order for arranging the data base list is an alphabetical order of the first names. As explained earlier, the illustrated pivot points are designated and displayed to a user based upon the relevance criteria defined for that user. The illustrated pivot points can for example be designated upon the relevance criteria to the user being content/context based of sent e-mails as discussed in detail supra. The user can selectively expand the illustrated structure by clicking a pointer to the area shown by the "+" sign 520. In addition, as depicted in FIG. 6, clicking on the designated pivot point can display any type of information 600 that the user has associated with the pivot points. Although not shown in this figure, in addition to displayed pivot points, various functions (e.g., cut, copy, merge, paste, save, delete, send . . . ) can be displayed for example via a pop-up menu upon the pivot point/node being expanded. It is to be appreciated that the clicking on the pivot points can also provide for certain functionalities to be associated with that particular pivot point, upon expansion as well as when the pivot point is not expanded (e.g., when a cursor is moved over the pivot point, the contents can be displayed as well as functionalities displayed that can be effected on the node and/or contents therein without having to expand the node).

Figure 7:
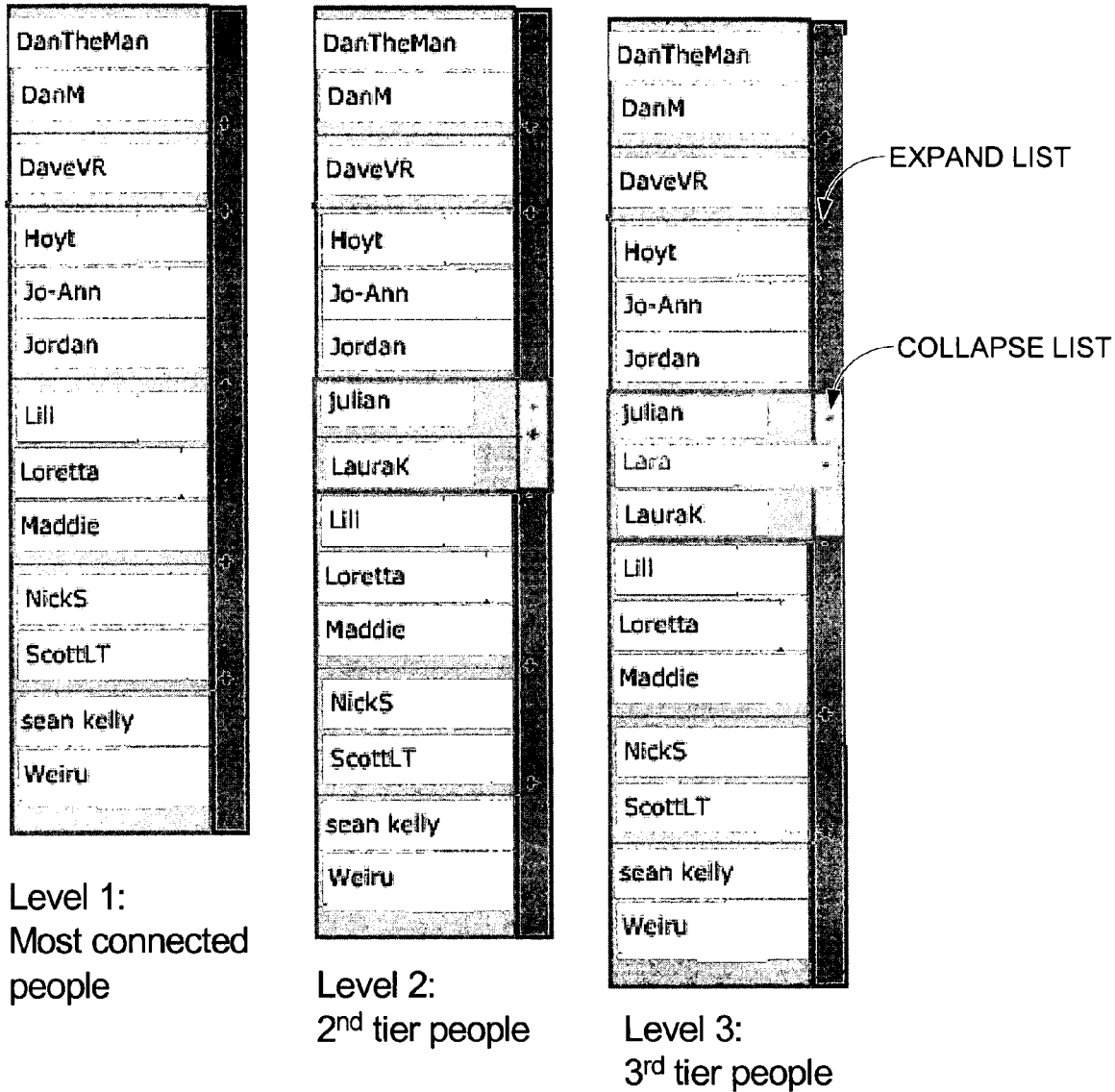
FIG. 7 is another example of pivot point hierarchy structure in accordance with an aspect of the present invention

Referring now to FIG. 7, a related aspect of the present invention is illustrated that enables a user to selectively expand and delve in to various levels to obtain desired information. As illustrated and explained earlier, a selective number of people's names are designated as pivot points based on the relevance criteria, which can be based in part on the importance of the selected data to a user. It is to be appreciated, that the methodology and system of semi-collapsed lists can be applied to many different classifications, and not just people. For example, the present invention can also be applied to a list of keywords (categories), and a list of dictionary (encyclopedia) entries. In addition the list can comprise any data type such as for example; e-mails, instant messages, audio files, voice calls, video files, digital movies and generally any data or document employed by the user.

Initially, when the list is displayed to the user, it can contain merely the top few (e.g. 10–20) most significant names in an alphabetical order, which is the logical order employed at FIG. 7. This can offer a one step access to most frequently used names e.g. a simple one-click access to the information about the most relevant people. As illustrated in FIG. 7, at any given time all contact names are presentable to the user as an, alphabetically-ordered list, albeit in a folded or expandable manner. By clicking on the "−" sign the list can be collapsed to its state before expansion. In addition, various shades or colors can be employed for the various levels.

As such, the location of any name is fully predictable since the hidden names follow the same alphabetic logical order. In addition, names that are less significant to a user can require multiple expansions to be performed on the displayed list. Nonetheless, the logical order remains the same, even though various names can acquire (or lose) pivot point status, depending on the relevance criteria, and the user's activity.

Also, a search function can be employed in conjunction with the browsing aspect. For example by pressing the letter "M" on the keyboard, the name of an important person for the user that begins with such letter at a first level is presented.

However, if at the first level no person's name begins with the letter 'M', the list is automatically expanded up to a level where such name initially appears. Effectively, the search finds the first most important name satisfying the search criteria. If there are other names at the same expansion level fulfilling the criteria, they are shown alongside the first one. At the same time, the other less important names (from higher expansion levels) are hidden, whether they fit the search criteria or not. Such a methodology enables a user to view the most important or relevant entries first. Accordingly, the system attempts to guess what a user (most likely) has in mind, even if the query does not return a unique result.

Thus, the present invention facilitates data retrieval and visualization by simultaneously combining the logical order of data, with relevance criteria that indicates importance of the data to a user, and is independent of the logical order. In addition, for such a people list data base, since the logical order can be alphabetical, the negative connotation associated with positioning people's name at the various levels can be minimized; e.g. any implication of inferiority for a data (person's name) can be justified because the logical list is arranged alphabetically.

Figure 8:
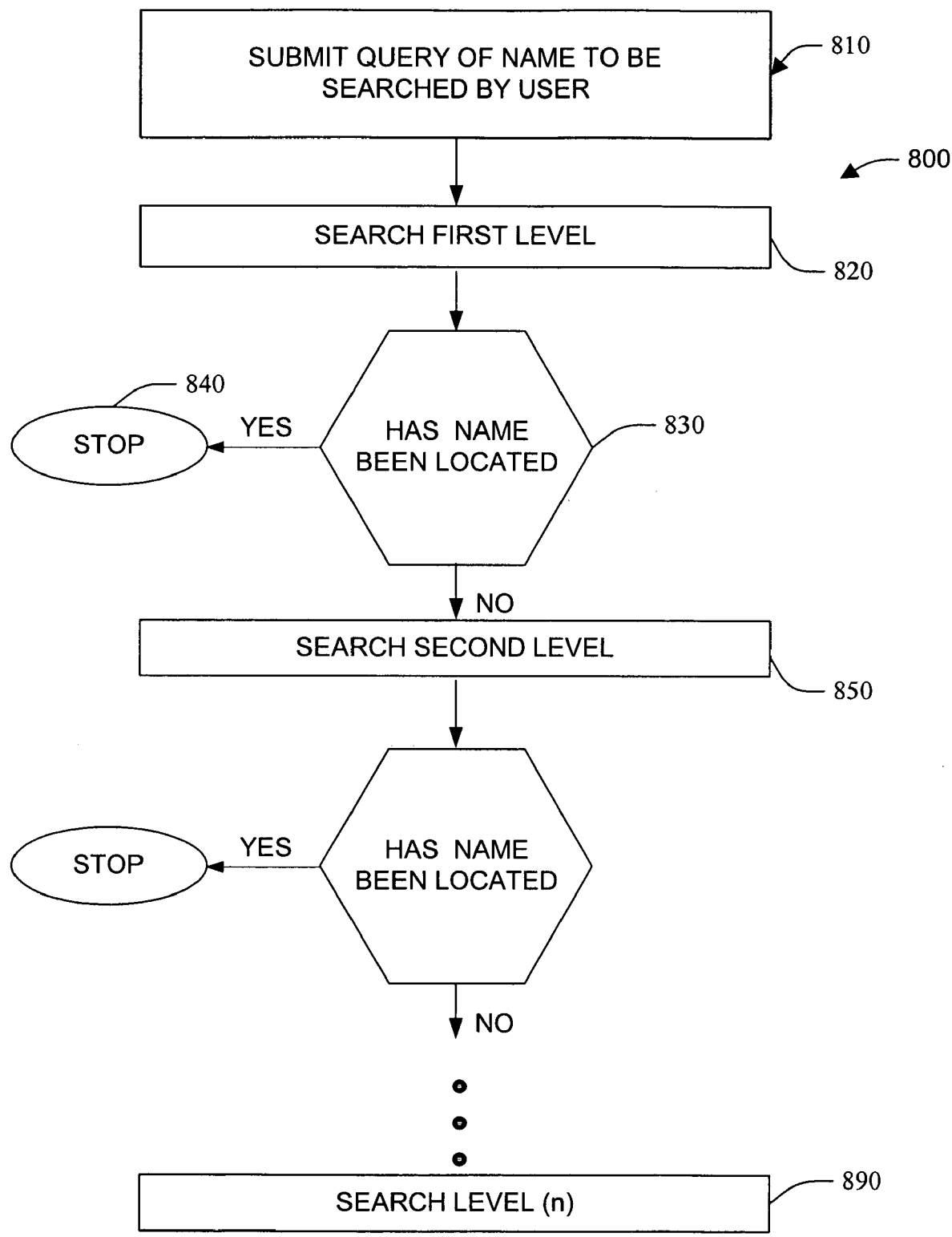
FIG. 8 illustrates a flow chart of a query search methodology in a people list data base in accordance with an aspect of the present invention.

Referring now to FIG. 8, a query search 800 for a person's name based on the relevance criteria is depicted. As illustrated at 810, a query is submitted by the user and the search is initially conducted at level 1, and upon a limited number of data presented, at 820. At 830, a determination is made as to whether desired name has been located. If so, the method stops at 840, with the query results displayed to a user. Otherwise, the methodology continues to level 2 at 850, with similar steps continued to the last level of data base expansion n, at 890, wherein n is a positive integer. Such a methodology facilitates a user's search performed on a data base list as the query need not be calculated nor performed on all data. Put differently, a query search is initially performed on an initial level before progression to a subsequent level, and thus system resources can be preserved and properly allocated to other desired tasks. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described.

Figure 9:
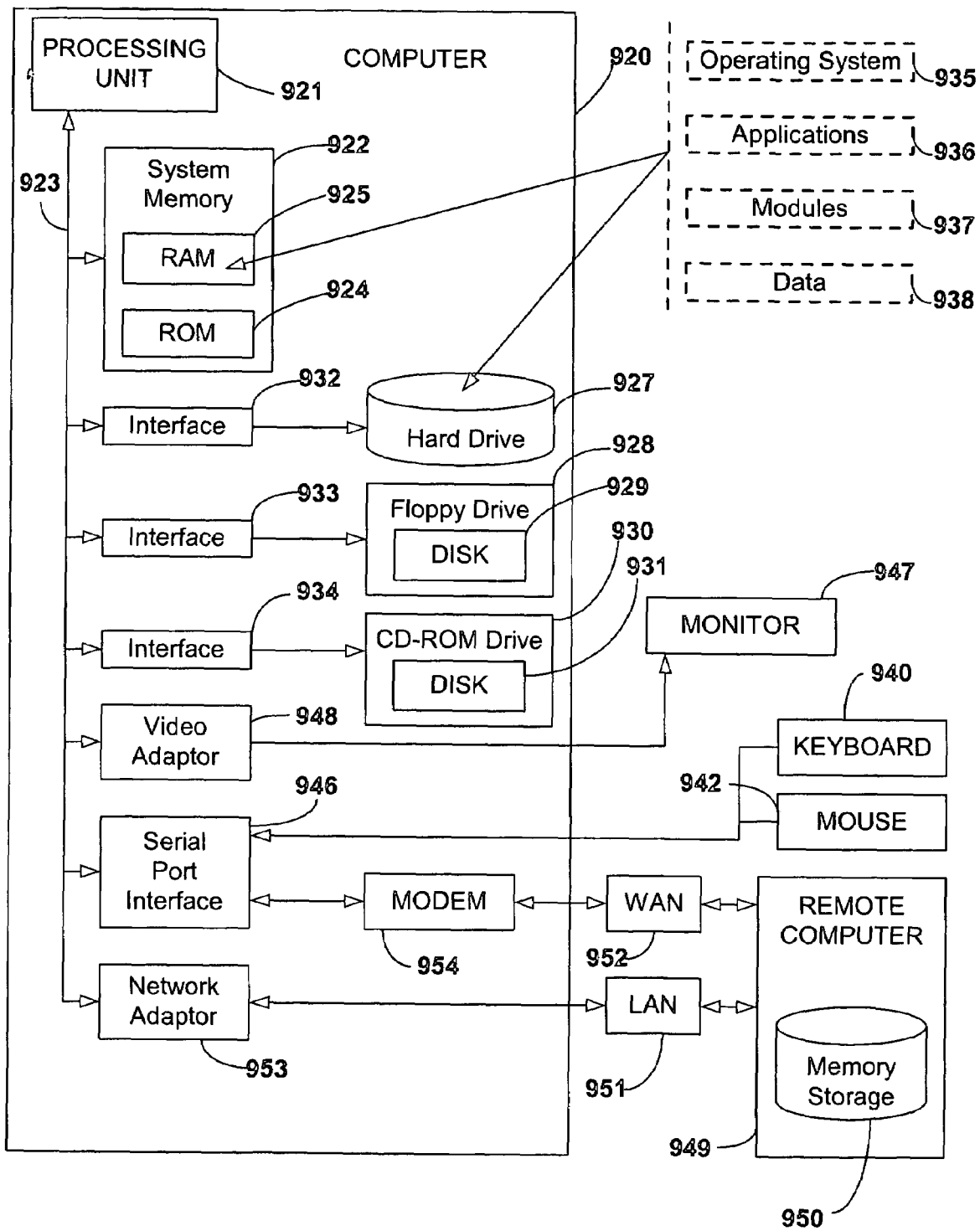
FIG. 9 is a schematic block diagram illustrating a suitable computing environment in accordance with an aspect of the present invention.

In order to provide a context for the various aspects of the invention, FIG. 9 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary system for implementing the various aspects of the invention includes a computer 920, including a processing unit 921, a system memory 922, and a system bus 923 that couples various system components including the system memory to the processing unit 921. The processing unit 921 may be any of various commercially available processors. Dual microprocessors and other multi-processor architectures also can be used as the processing unit 921.

The system bus may be any of several types of bus structure including a memory bus or memory controller, a peripheral bus, and a local bus using any of a variety of commercially available bus architectures. The system memory may include read only memory (ROM) 924 and random access memory (RAM) 925. A basic input/output system (BIOS), containing the basic routines that help to transfer information between elements within the computer 920, such as during start-up, is stored in ROM 924.

The computer 920 further includes a hard disk drive 927, a magnetic disk drive 928, e.g., to read from or write to a removable disk 929, and an optical disk drive 930, e.g., for reading from or writing to a CD-ROM disk 931 or to read from or write to other optical media. The hard disk drive 927, magnetic disk drive 928, and optical disk drive 930 are connected to the system bus 923 by a hard disk drive interface 932, a magnetic disk drive interface 933, and an optical drive interface 934, respectively. The drives and their associated computer-readable media provide nonvolatile storage of data, data structures, computer-executable instructions, etc. for the computer 920. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 925, including an operating system 935, one or more application programs 936, other program modules 937, and program data 938. The operating system 935 in the illustrated computer may be substantially any commercially available operating system.

A user may enter commands and information into the computer 920 through a keyboard 940 and a pointing device, such as a mouse 942. Other input devices (not shown) may include a microphone, a joystick, a game pad, a satellite dish, a scanner, or the like. These and other input devices are often connected to the processing unit 921 through a serial port interface 946 that is coupled to the system bus, but may be connected by other interfaces, such as a parallel port, a game port or a universal serial bus (USB). A monitor 947 or other type of display device is also connected to the system bus 923 via an interface, such as a video adapter 948. In addition to the monitor, computers typically include other peripheral output devices (not shown), such as speakers and printers.

The computer 920 may operate in a networked environment using logical connections to one or more remote computers, such as a remote computer 949. The remote computer 949 may be a workstation, a server computer, a router, a peer device or other common network node, and typically includes many or all of the elements described relative to the computer 920, although only a memory storage device 950 is illustrated in FIG. 9. The logical connections depicted in FIG. 9 may include a local area network (LAN) 951 and a wide area network (WAN) 952. Such networking environments are commonplace in offices, enterprise-wide computer networks, Intranets and the Internet.

When employed in a LAN networking environment, the computer 920 may be connected to the local network 951 through a network interface or adapter 953. When utilized in a WAN networking environment, the computer 920 generally may include a modem 954, and/or is connected to a communications server on the LAN, and/or has other means for establishing communications over the wide area network 952, such as the Internet. The modem 954, which may be internal or external, may be connected to the system bus 923 via the serial port interface 946. In a networked environment, program modules depicted relative to the computer 920, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 920, unless otherwise indicated. Such acts and operations are sometimes referred to as being computer-executed. It will be appreciated that the acts and symbolically represented operations include the manipulation by the processing unit 921 of electrical signals representing data bits which causes a resulting transformation or reduction of the electrical signal representation, and the maintenance of data bits at memory locations in the memory system (including the system memory 922, hard drive 927, floppy disks 929, and CD-ROM 931) to thereby reconfigure or otherwise alter the computer system's operation, as well as other processing of signals. The memory locations wherein such data bits are maintained are physical locations that have particular electrical, magnetic, or optical properties corresponding to the data bits.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising."

What is claimed is:

1. A data management system comprising:
    a designator that analyzes data and creates a plurality of hierarchy levels, each hierarchy level represents subsets of the data designated as pivot points, the pivot point(s) for respective levels are selected from the data based upon relevance criteria that indicate importance of the data to a user; and
    a display component that can selectively display the pivot points to the user as a function of logical order and relevance to the user.

2. The system of claim 1, the data comprises a list of people.

3. The system of claim 1, the logical order is alphabetical order.

4. The system of claim 1, the logical order is at least one of a numerical order and a chronological order.

5. The system of claim 1, further comprising a priority system with a classifier that determines the relevance of data to the user.

6. The system of claim 1, each expanded hierarchy level employs a different color or shade from a collapsed state thereof.

7. The system of claim 5, the classifier is provided with at least one of an explicit and implicit training.

8. The system of claim 7, the relevance criteria are in part based on a number of electronic messages sent from a user to a recipient in a predetermined time span.

9. The system of claim 7, the relevance criteria are in part based on content of electronic messages sent from a user to a recipient.

10. The method of claim 9, the sent electronic messages assigned a priority and the relevance criteria determined therefrom.

11. The system of claim 7, the classifier is at least one of a Support Vector Machine, Bayesian, and decision tree model.

12. The system of claim 7, the explicit training comprises defining one or more training sets including one or more words respectively, the one or more training sets having a predetermined importance to the user.

13. The method of claim 1, the pivot point dynamically updated based upon a state of the user.

14. The method of claim 1, the command by the user comprising clicking a mouse on a designated area.

15. The system of claim 1, the relevance criteria are a function of content of the data.

16. The system of claim 1, the relevance criteria are a function of context of the data.

17. The system of claim 1, the relevance criteria are a function of volume of the data.

18. The system of claim 1, the data comprises e-mail.

19. The system of claim 1, the data comprises instant messages.

20. The system of claim 1, the data comprises documents.

21. The system of claim 1, the data comprises media.

22. The system of claim 21, the media comprises at least one of audio files and voice calls.

23. The system of claim 21, the media comprises video files.

24. The system of claim 23, the video files comprise digital movies.

25. The system of claim 1, the designator is part of a portable electronic unit.

26. The system of claim 25, the portable electronic unit is at least one of a PDA, cellular phone, portable computer, hand held terminal, watch and a programmable toy.

27. A computer readable medium comprising the computer executable components of claim 1.

28. A data packet that passes between at least two computer processes, comprising at least one of the computer executable components of claim 1.

29. A method for managing a data base system comprising:
    arranging a data structure according to a logical order in an expandable hierarchy multiple level format;
    displaying selected data from the data structure designated as pivot points to a user, the pivot points for each level are selected from the data structure based upon relevance criteria indicative of importance of the selected data to the user; and selectively expanding a level to next level in response to a command by the user.

30. The method of claim 29, further comprising collapsing a level to a previous level in response to a further command by the user.

31. The method of claim 29, further comprising employing a classifier in connection with determining the relevance criteria.

32. The method of claim 29, further comprising employing a classifier in connection with applying the relevance criteria.

33. The method of claim 29, further comprising training the classifier according to one or more categories of priority or relevance to a user.

34. The method of claim 29, further comprising training the classifier based upon context or content of electronic messages sent to recipients.

35. A computer readable medium comprising computer executable instructions for carrying out the method of claim 29.

* * * * *